United States Patent [19]
Brückner et al.

[11] Patent Number: 6,089,013
[45] Date of Patent: Jul. 18, 2000

[54] CONFIGURATION FOR DEAERATING A CONDENSATE

[75] Inventors: Herman Brückner, Uttenreuth; Erich Schmid, Rathsberg, both of Germany

[73] Assignee: Siemens Aktiengesellschaft, Munich, Germany

[21] Appl. No.: 09/283,905

[22] Filed: Apr. 1, 1999

Related U.S. Application Data

[63] Continuation of application No. PCT/DE96/00756, May 2, 1996, and a division of application No. 08/971,491, Nov. 17, 1997, Pat. No. 5,904,039.

[30] Foreign Application Priority Data

May 15, 1995 [DE] Germany .......................... 195 17 792

[51] Int. Cl.[7] .................................................. F02C 6/18
[52] U.S. Cl. ........................................................ 60/39.182
[58] Field of Search ............................ 60/39.07, 39.182; 122/7 R

[56] References Cited

U.S. PATENT DOCUMENTS

| | | | |
|---|---|---|---|
| 4,354,347 | 10/1982 | Tomlinson et al. | 60/39.182 |
| 4,465,027 | 8/1984 | Steinegger | 60/39.182 |
| 4,961,311 | 10/1990 | Pavel et al. | 60/39.182 |
| 4,976,100 | 12/1990 | Lee | 60/39.182 |
| 5,251,432 | 10/1993 | Bruckner et al. | 60/39.182 |
| 5,404,708 | 4/1995 | Sigling et al. | 60/39.182 |

*Primary Examiner*—Louis J. Casaregola
*Attorney, Agent, or Firm*—Herbert L. Lerner; Laurence A. Greenberg; Werner H. Stemer

[57] ABSTRACT

Condensate of a combined-cycle gas and steam turbine plant is deaerated. The condensate is heated in a feedwater tank to which preheated condensate is supplied. The condensate is preheated in a waste-steam generator heated by waste heat of the gas turbine. Feedwater is extracted and warmed in heating surfaces connected in the water/steam loop of the steam turbine and heated by the exhaust gas from the gas turbine. In order to guarantee adequate deaeration of the condensate at a simultaneously high efficiency of the plant through especially high energy utilization of the waste heat from the gas turbine, a partial flow of the preheated condensate or a partial flow of preheated feedwater is used as heating medium for heating the condensate. A low-pressure economizer is connected downstream of a condensate preheater in the waste-heat steam generator via a feedwater tank. The condensate preheater or the low-pressure economizer have at their outlet an outflow line leading into the feedwater tank.

4 Claims, 2 Drawing Sheets

CONFIGURATION FOR DEAERATING A CONDENSATE

CROSS-REFERENCE TO RELATED APPLICATION

This application is a continuation of copending International application No. PCT/DE96/00756, filed May 2, 1996, which designated the United States, and a division of application Ser. No. 08/971,491 filed Nov. 17, 1997 (U.S. Pat. No. 5,904,039).

BACKGROUND OF THE INVENTION

1. Field of the Invention

The invention relates to a method of deaerating or degassing a condensate in a water/steam loop of a gas and steam-turbine plant. Furthermore, it relates to an arrangement for carrying out the method.

In a gas and steam-turbine plant (combined cycle gas turbine plant), the heat contained in the exhaust gas from the gas turbine is utilized for generating steam for the steam turbine. In the process, the steam expanded in the steam turbine is condensed in a water/steam loop, and the feedwater accumulating as a result is evaporated in a waste-heat boiler through which the hot exhaust gas from the gas turbine flows. In order to avoid corrosion in the water/steam loop, the gas released in the condensate, in particular oxygen, is normally removed by thermal deaeration or degassing. To that end, a deaerator or degasser is normally provided in a feedwater tank connected downstream of the condenser of the steam turbine, the condensate, which flows to the feedwater and is slightly undercooled at a temperature of 8 to 15 K, being heated up to boiling point in the feedwater tank by a heating medium.

2. Description of the Related Art

In a prior art method of heating and degassing the condensate collected in the feedwater tank disclosed in the publication "Handbuch der Energie" [Energy Handbook], vol. 7, 1984, pages 100–107, steam is used as heating medium, which for this purpose is additionally generated in a low-pressure evaporator in the waste-heat boiler. As shown in European Patent Application No. 0 515 911, steam in the form of tapped steam from a low-pressure part of the steam turbine may alternatively be used as heating medium. In both cases, however, the heating steam is lost from the steam driving the steam turbine and, accordingly, the efficiency of the plant is limited.

European Patent Application EP 0 037 845, in addition, discloses a combined cycle gas turbine plant in which a separate preheating coil, which is conducted via the waste-heat boiler, is provided to preheat the feed water. JP-A-55/109708 discloses a combined cycle gas turbine plant in which preheated feed water is introduced to heat the feed water tank. However, in those systems, considerable expenditure on equipment is involved to provide the systems required for condensate deaeration.

SUMMARY OF THE INVENTION

It is accordingly an object of the invention to provide a method of degassing a condensate in a water/steam loop of a combined cycle gas turbine plant, in which method, by particularly simple means, adequate deaeration of the condensate is guaranteed at high efficiency of the plant through especially high energy utilization of the waste heat from the gas turbine. It is a further object to provide for a system wherein the method can be suitably performed.

With the foregoing and other objects in view there is provided, in accordance with the invention, a method of deaerating a condensate of a combined cycle gas turbine plant with a steam turbine and a gas turbine, the method which comprises:

supplying preheated condensate to a feedwater tank;

extracting feedwater from the feedwater tank and conducting the feedwater to heating surfaces in a water/steam loop of a steam turbine and heating the feedwater in the heating surfaces with exhaust gas from a gas turbine;

admixing cold condensate to the preheated condensate;

and deaerating the condensate in the feedwater tank by heating the condensate with a heating medium selected from a partial flow of the unmixed preheated condensate and a partial flow of preheated feedwater.

In other words, the objects of the invention are satisfied in that cold condensate is admixed to the preheated condensate, and a partial flow of the preheated unmixed condensate or a partial flow of the preheated feedwater is used as the heating medium.

The invention is premised on the concept that the heating medium for the deaeration in the feedwater tank should be obtained as far as possible from the low-pressure temperature range of the gas-turbine exhaust gases while avoiding the extraction of steam from the water/steam loop in order to thereby achieve especially high utilization of the exhaust-gas heat and thus a high efficiency of the waste-heat boiler. To set the feedwater temperature in the feedwater tank, only part of the condensate is preheated, to which cold condensate is subsequently mixed.

Here, the partial flow may be passed directly into the feedwater tank. However, the partial flow is preferably expanded before it is passed into the feedwater tank: In this case, both steam arising during the expansion of the partial flow and water arising in the process are fed to the feedwater tank.

In accordance with a further feature of the invention, the preheat temperature of the condensate before it enters the feedwater tank is set by at least some of the preheated condensate which is being circulated. In that case, preheated condensate is admixed to the cold condensate.

In addition to the deaeration function, the feedwater tank also performs the function of an intermediate reservoir, its filling level for setting the feedwater flow fed to the water/steam loop being monitored with the aid of the condensate level arising in the feedwater tank. In order to achieve especially effective deaeration of the condensate, the heating medium is preferably passed into the feedwater tank below the condensate level. The gases released by the heating of the condensate then emerge at the surface of the condensate level so that the vapor venting of the released gases takes place in the feedwater tank.

With the above and other objects in view there is also provided, in accordance with the invention, a system for deaerating the condensate in the combined cycle gas turbine plant with a steam turbine, a gas turbine, a waste-heat steam generator in which exhaust gas of the gas turbine is used to heat steam for the steam turbine, a condensate preheater connected in a water/steam loop of the steam turbine, a feedwater tank connected to the condensate preheater, and a low-pressure economizer connected to the feedwater tank, a system for deaerating a condensate in the feedwater tank, which comprises:

an outflow line connected from the condensate preheater into the feedwater tank, and a bypass line connected between a condenser and the feedwater tank, said bypass line being connected in parallel with the condensate preheater.

In other words, the novel system is defined within a waste-heat steam generator having a condensate preheater connected in a water/steam loop. The objects of the system are satisfied in that a low-pressure economizer is connected downstream of the condensate preheater via the feedwater tank. The condensate preheater has on the outlet side an outflow line leading into the feedwater tank and a bypass line, connected between a condenser and the feedwater tank, and connected in parallel with the condensate preheater.

Alternatively, the low-pressure economizer has on the outlet side an outflow line leading into the feedwater tank.

The introduction of the heating medium, i.e. of the preheated condensate or the preheated feedwater, into the feedwater tank may be effected in different ways. One possibility is for the hot and pressurized water or condensate coming out of the condensate preheater to be passed via a suitable pipe system having a nozzle pipe directly into the feedwater tank so that the water/steam mixture expands there in the nozzle pipe.

In an alternative configuration, the expansion is effected in an expansion tank which is connected in the outflow line. Here, the expansion tank is expediently connected to the feedwater tank on both the steam side and the water side.

The condensate temperature is expediently set, in accordance with the invention, by means of a return line connected in parallel with the condensate preheater.

Other features which are considered as characteristic for the invention are set forth in the appended claims.

Although the invention is illustrated and described herein as embodied in a method of and system for deaerating a condensate, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
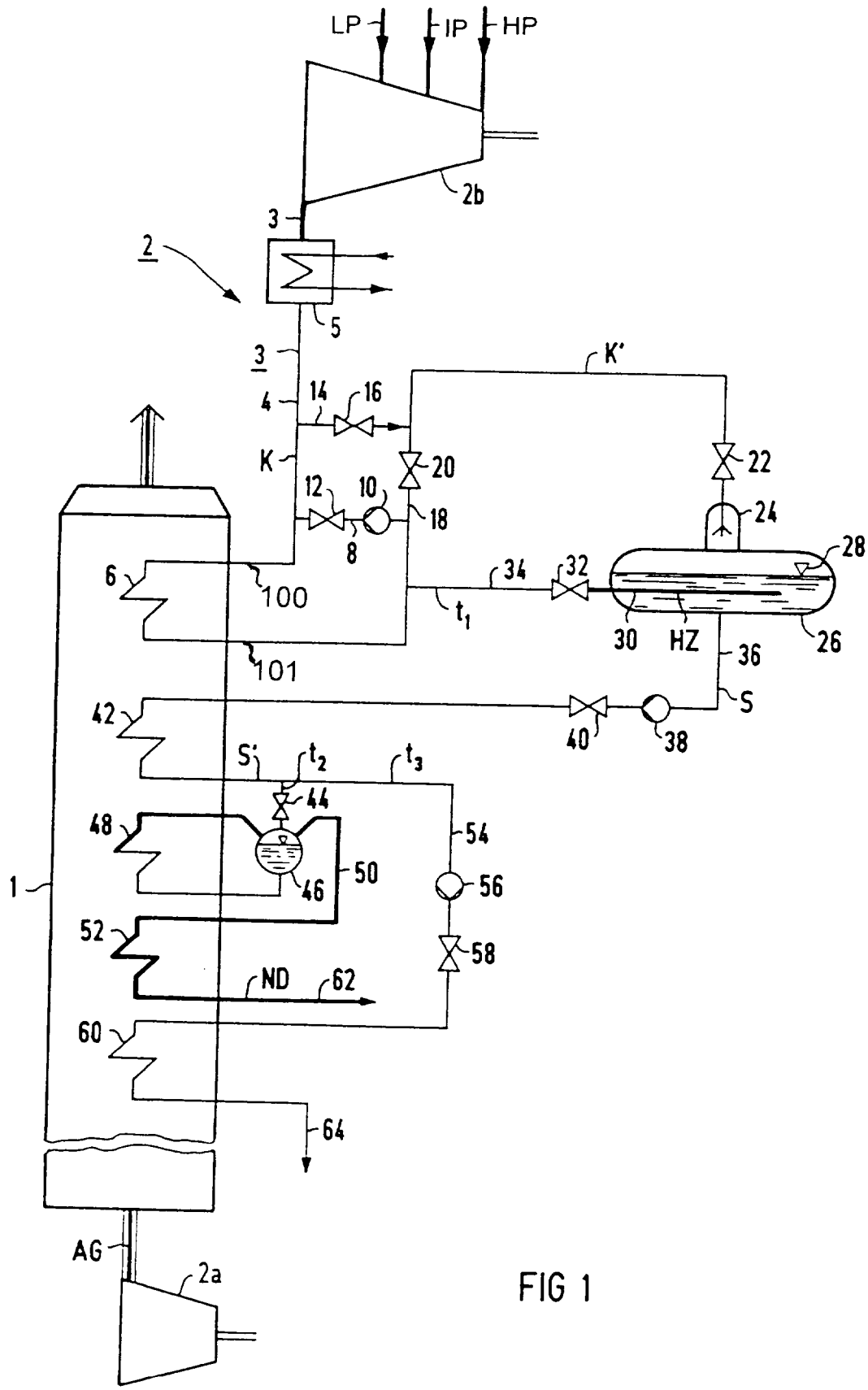
FIG. 1 is a partial, cut-away section of a waste-heat steam generator of a combined cycle gas turbine plant with a loop for deaeration in the feedwater tank.

Referring now to the figures of the drawing in detail and first, particularly, to FIG. 1 thereof, there is seen a waste-heat steam generator 1 shown in cutaway section. The waste-heat steam generator 1 forms a part of a combined cycle gas turbine plant 2 for generating electric energy. The hot exhaust gas AG from a gas turbine 2a flows through the generator 1 and it serves to generate steam. Heating surfaces of the generator 1 are fluidically bound into a water/steam loop 3 of a steam turbine 2b.

To this end, the waste-heat steam generator 1 has a condensate preheater 6 which is connected to a condenser 5 via a condensate line 4 and is connected on the outlet side 100 to its inlet 101 via a return line 8 having a circulating pump 10 and a valve 12.

A bypass line 14 with a valve 16 is connected in parallel with the condensate preheater 6 in order to circumvent it when required. In addition, the condensate preheater 6 is connected on the outlet side to a deaerator 24 via a line 18 in which valves 20 and 22 are connected, which deaerator 24 is part of a feedwater tank 26. A nozzle pipe 30 leads into the feedwater tank 26 below a condensate level 28, which nozzle pipe 30 is connected via a valve 32 in a pipe line 34 to the line 18 and thus to the outlet of the condensate preheater 6.

The outlet of the feedwater tank 26 is connected via a feedwater line 36 having a feedwater pump 38 and a valve 40 to a low-pressure preheater or low-pressure economizer 42. The low-pressure economizer 42 is a heating surface in the waste-heat steam generator 1. The low-pressure economizer 42 is connected via a valve 44 to a low-pressure drum 46 to which a low-pressure evaporator 48 likewise arranged as a heating surface in the waste-heat steam generator 1 is connected. On the steam side (bold line), the low-pressure drum 46 is connected via a line 50 to a low-pressure superheater 52. The low-pressure superheater 50 also forms a heating surface in the waste-heat steam generator 1.

In addition, the outlet of the low-pressure economizer 42 is connected, via a line 54 with a pump 56 and a valve 58, to a further economizer heating surface 60 arranged in the waste-heat steam generator 1. On the outlet side, the economizer heating surface 60 connects to further evaporator and superheater heating surfaces (not illustrated in detail for purposes of clarity) which are disposed in the waste-heat steam generator 1 and which lead into the steam turbine 2b in the same way as the low-pressure superheater 52. This is indicated by the arrows 62 and 64. In this configuration, steam at different pressure stages, i.e. low-pressure steam LP, intermediate-pressure steam IP, and high-pressure steam HP, is supplied to the steam turbine 2b.

During the operation of the waste-heat steam generator 1, condensate K from the condenser 5 (connected downstream of the steam turbine) is fed to the condensate preheater 6 via the condensate line 4. In the process, the condensate preheater 6 may be completely or partly circumvented via the bypass line 14. The condensate K is heated in the condensate preheater 6 by heat exchange with the hot exhaust gas AG from the gas turbine 2a and to this end is at least partly circulated via the circulating pump 10 in the return line 18. The heated condensate K' is passed via the line 18 into the feedwater tank 26. In the process, the preheated condensate K' is heated there by means of a partial flow $t_1$, passed via the line 34, of the preheated condensate K'. To this end, the partial flow $t_1$ is passed as heating medium HZ directly into the feedwater tank 26 via the valve 32, in the course of which it expands in the nozzle pipe 30. The vapor venting of the released gases therefore takes place only in the feedwater tank 26.

The preheated condensate K' is fed as feedwater S via the feedwater pump 38 to the low-pressure economizer 42, the feedwater S being further heated there. A partial flow $t_2$ of the preheated feedwater S is passed into the low-pressure drum 46. The partial flow $t_2$ is evaporated in the low-pressure evaporator 48. Steam separated in the low-pressure drum 46 is superheated in the low-pressure superheater 52, and the superheated low-pressure steam LP is fed to the low-pressure pressure part of the steam turbine 2b.

A partial flow $t_3$ of the preheated feedwater S' is brought to a high pressure level by means of the pump 56 and is then further heated in the economizer 60. The partial flow t3 is likewise evaporated in a manner not shown in more detail and the superheated high-pressure steam HP is fed to the high-pressure part of the steam turbine 2b.

Figure 2:
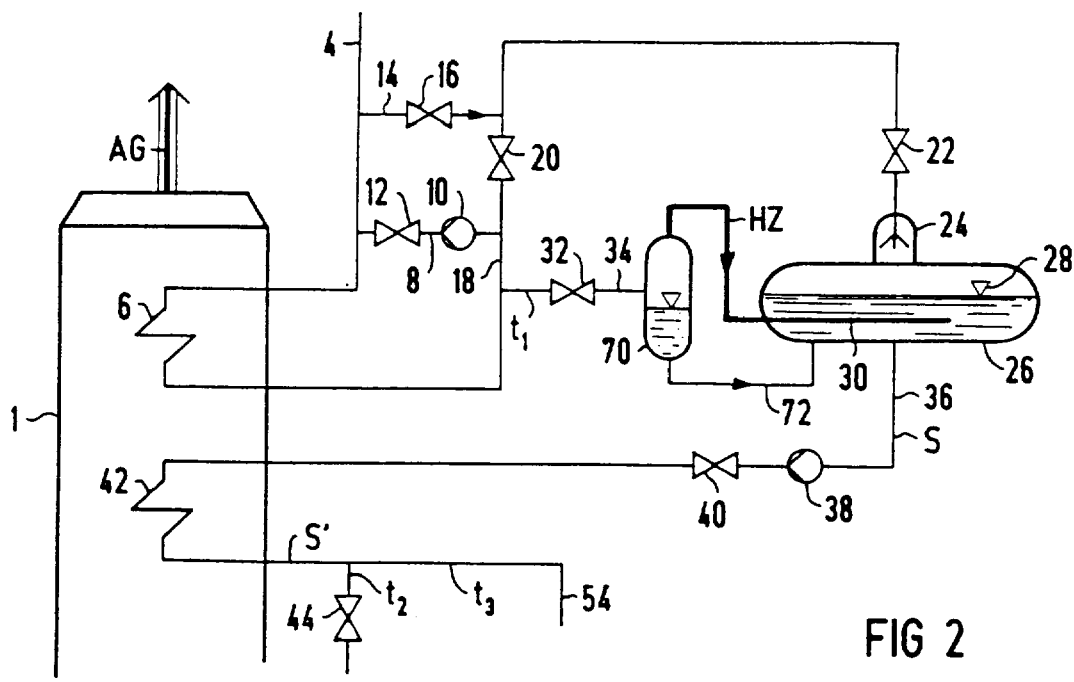
FIG. 2 is a similar view of a different embodiment with an expansion tank in the condensate run.

In the exemplary embodiment according to FIG. 2, an expansion tank 70 is connected in the outflow line 34. The steam separated during the expansion of the partial flow $t_1$ of the preheated condensate K' in the expansion tank 70 is used here as heating medium HZ. The water separated during the expansion of the partial flow $t_1$ in the expansion tank 70 is supplied to the feedwater tank 26 via the line 72.

Figure 3:
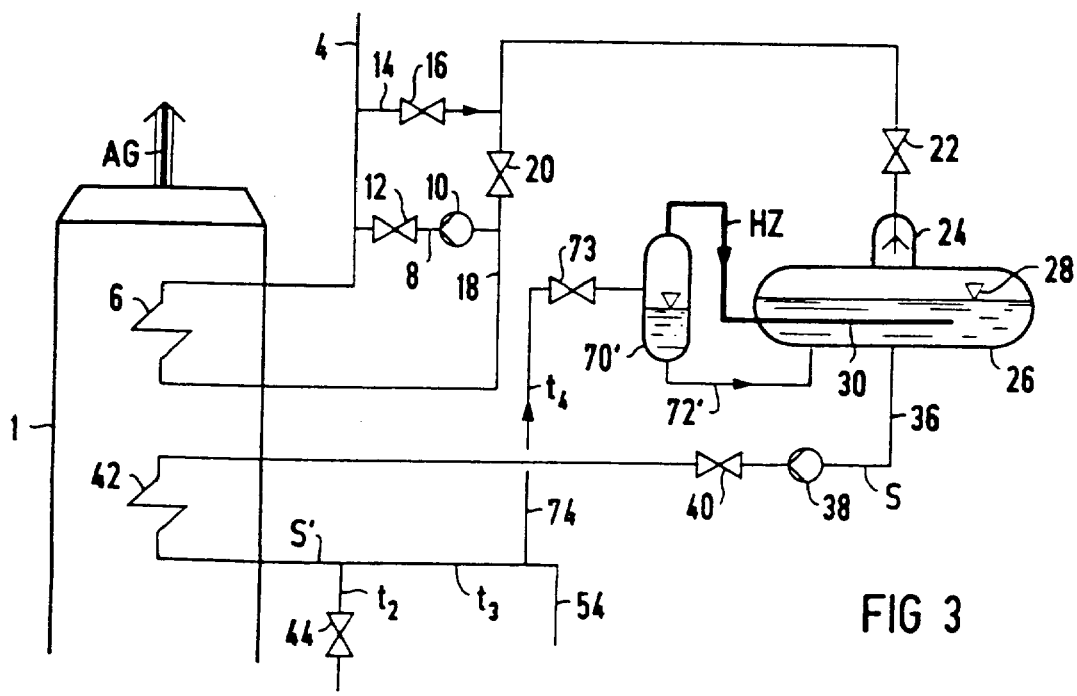
FIG. 3 is a similar view of a further embodiment with an expansion tank in the feedwater run.

In the exemplary embodiment according to FIG. 3, the output of the low-pressure economizer 42 is connected to the feedwater tank 26 via an outflow line 74 which has a valve 73. A partial flow $t_4$ of the preheated feedwater S' is carried in the line 74. The steam separated during the expansion of the partial flow $t_4$ of the preheated feedwater S' in the expansion tank 70' is used here as heating medium HZ for heating the condensate K' in the feedwater tank 26. The expansion tank 70' is also connected on the water side to the feedwater tank 26 via a line 72'.

Through the use of either the partial flow $t_1$ of the preheated condensate K' or the partial flow $t_4$ of the preheated feedwater S' as heating medium HZ for heating the condensate K' in the feedwater tank 26, heat for the heating medium HZ is extracted from the low-temperature range of the waste-heat steam generator 1 in an especially effective manner without the need for additional preheater or evaporator heating surfaces and/or additional auxiliary units, such as pumps for example.

We claim:

1. In a combined cycle gas turbine plant with a steam turbine, a gas turbine, a waste-heat steam generator in which exhaust gas of the gas turbine is used to heat steam for the steam turbine, a condensate preheater connected in a water/steam loop of the steam turbine, a feedwater tank connected to the condensate preheater, and an economizer connected to the feedwater tank, a system for deaerating a condensate in the feedwater tank, which comprises:
an outflow line connecting the economizer with the feedwater tank, and a bypass line connected in parallel with the condensate preheater.

2. The system according to claim 1, which further comprises an expansion tank connected in said outflow line.

3. The system according to claim 2, which further comprises a water line, the expansion tank communicating with the feedwater tank through the water line.

4. The system according to claim 1, which further comprises a return line, the condensate preheater including an inlet and an outlet connected to the inlet through the return line.

* * * * *